United States Patent [19]
Makita et al.

[11] Patent Number: 5,188,444
[45] Date of Patent: Feb. 23, 1993

[54] VEHICULAR HEADLAMP

[75] Inventors: Hiroyuki Makita; Shuichi Kochi, both of Shizuoka, Japan

[73] Assignee: Koito Manufacturing Co., Ltd., Tokyo, Japan

[21] Appl. No.: 775,132

[22] Filed: Oct. 11, 1991

[30] Foreign Application Priority Data

Oct. 15, 1990 [JP] Japan ................... 2-275943
Mar. 19, 1991 [JP] Japan ................... 3-54595
Sep. 13, 1991 [JP] Japan ................... 3-234786

[51] Int. Cl.$^5$ ............................................. B60Q 1/00
[52] U.S. Cl. ........................................ 362/80; 362/61; 362/267; 362/265
[58] Field of Search ................... 362/80, 61, 263, 419, 362/265, 267

[56] References Cited

U.S. PATENT DOCUMENTS

| | | | |
|---|---|---|---|
| 4,300,189 | 11/1981 | Shanks | 362/267 |
| 4,714,986 | 12/1987 | Wurster | 362/263 X |
| 4,731,706 | 3/1988 | Ricard | 362/419 X |
| 4,774,636 | 9/1988 | Gaugel et al. | 362/263 |
| 4,902,459 | 4/1990 | Rothwell, Jr. et al. | 362/265 X |
| 5,113,330 | 5/1992 | Makita | 362/419 X |

Primary Examiner—Larry Jones
Attorney, Agent, or Firm—Sughrue, Mion, Zinn, Macpeak & Seas

[57] ABSTRACT

A vehicular headlamp employing a discharge bulb as a light source in which a lighting circuit for the bulb, including an ignitor, is secured to a lamp housing in such a manner as to cover a rear opening in the housing. This arrangement results in significantly reduced danger of shock and reduced radiation of electromagnetic noise. In another embodiment of the invention, a lighting-circuit-accommodating unit containing a lighting circuit is bayonet-engaged with a circular opening in the rear wall of a lamp body, and also is fixed to the lamp body by a second fixing device in such a manner as to prevent rotation of the lighting-circuit-accommodating unit relative to the lamp body.

22 Claims, 6 Drawing Sheets

VEHICULAR HEADLAMP

BACKGROUND OF THE INVENTION

The present invention relates to vehicular headlamps, and more particularly to a novel vehicular headlamp having a discharge lamp as its light source and in which electromagnetic noise attributed to a high voltage section is minimized and the operating stability of the headlamp is improved.

Application of a discharge lamp such as a metal halide discharge lamp as the light source of a vehicular headlamp has been proposed. However, in order to turn on a discharge lamp, it is necessary to provide a lighting circuit for applying a high discharge voltage to the discharge lamp. In the case of a conventional vehicular headlamp of this type, the lighting circuit is supported on the vehicle body separately from the headlamp, and is connected through insulated lead wires to the headlamp.

However, in the case where the lighting circuit is supported on the vehicle body separately from the headlamp as described above, the lead wires carrying the high voltage are exposed where they can be reached by the hand of the user, which is hazardous. In addition, the lead wires, which are relatively long, radiate electromagnetic noise, thus adversely affecting electronic circuits and other components on the vehicle.

Further, recently in the motor vehicle lamp industry, development efforts have been directed to a discharge lamp which is excellent in light emission efficiency and in its output light spectrum characteristics and which has a long service life, and extensive research has been carried out on the use of a discharge bulb as the light source of a motor vehicular headlamp.

FIG. 1 shows a headlamp of such a type, which includes a lighting-circuit-accommodating unit 4 which encases a circuit used to start the discharge operation of a discharge bulb 2. The unit 4 is mounted on the rear side of a lamp body 1 in which a discharge bulb 2 is inserted. Reference numeral 6 designates a lens mounted on the front end of the lamp body 1.

In the above-described conventional headlamp, the lighting-circuit-accommodating unit 4 is secured to the lamp body 1 only with screws. Hence, in order to secure the lighting-circuit-accommodating unit 4 to the lamp body 1, it is necessary to turn the screws 5 with one hand while the unit 4 is being pushed against the lamp body with the other hand. This is a troublesome operation. Furthermore, the unit 4 may come loose from the lamp body 1 when vibrated because it is fastened to the lamp body only with the screws.

SUMMARY OF THE INVENTION

The above-described problems concerning the danger of electrical shock and radiation of electromagnetic noise have been solved by the provision of a vehicular headlamp in which, according to the invention, at least an ignitor forming a lighting circuit which supplies a discharge voltage to a discharge lamp is secured to a lamp housing in such a manner as to cover the rear opening of the lamp housing.

Hence, in the vehicular headlamp of the invention, the high voltage section is substantially closed; that is, it is not exposed. Thus, the inventive vehicular headlamp is free from the difficulty that the user can touch the high voltage section and receive an electric shock. As a result, the vehicular headlamp is improved in safety.

Furthermore, since the ignitor is disposed close to the discharge lamp, the distance through which high voltage current flows is short. Thus, the amount of electromagnetic noise due to the high voltage needed to operate the lamp is decreased.

More specifically, in a movable reflector type headlamp employing a discharge lamp as its light source, at least an ignitor forming a lighting circuit adapted to apply a discharge voltage to the discharge lamp is secured to the lamp housing in such a manner as to cover the rear opening of the lamp housing. Hence, the high voltage section is substantially closed; that is, it is not exposed to the outside. Thus, the vehicular headlamp is free from the danger of the user touching the high voltage section and receiving an electrical shock, and thus the vehicular headlamp is improved in safety. Furthermore, the ignitor is set close to the discharge lamp, and therefore the distance through which the high voltage current flows is short. Thus, the amount of electromagnetic noise due to the generation of the high voltage is decreased.

Further in view of the foregoing, another object of the invention is to provide a motor vehicular headlamp in which the lighting-circuit-accommodating unit can be secured to the lamp body with ease, and the unit thus secured will not come off the lamp body.

In order to achieve the above object, in a motor vehicular headlamp employing a discharge bulb as a light source, a circular opening is formed in the rear wall of the lamp body, and a lighting-circuit-accommodating unit holding a lighting circuit in a casing is bayonet-engaged with the circular opening from behind the lamp body, and is fixed in the circumferential direction of the circular opening by additional fixing means.

The lighting-circuit-accommodating unit can be bayonet-engaged with the circular opening of the lamp body with a single movement in such a manner that it cannot come off the lamp body, and it is fixedly secured with an additional fixing means so that it cannot turn in the circumferential direction of the circular opening.

DESCRIPTION OF THE PREFERRED EMBODIMENTS

Figure 1:
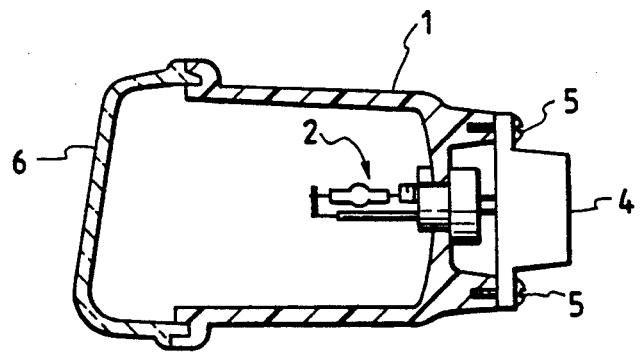
FIG. 1 is a side view of a conventional headlamp.
Figure 2:
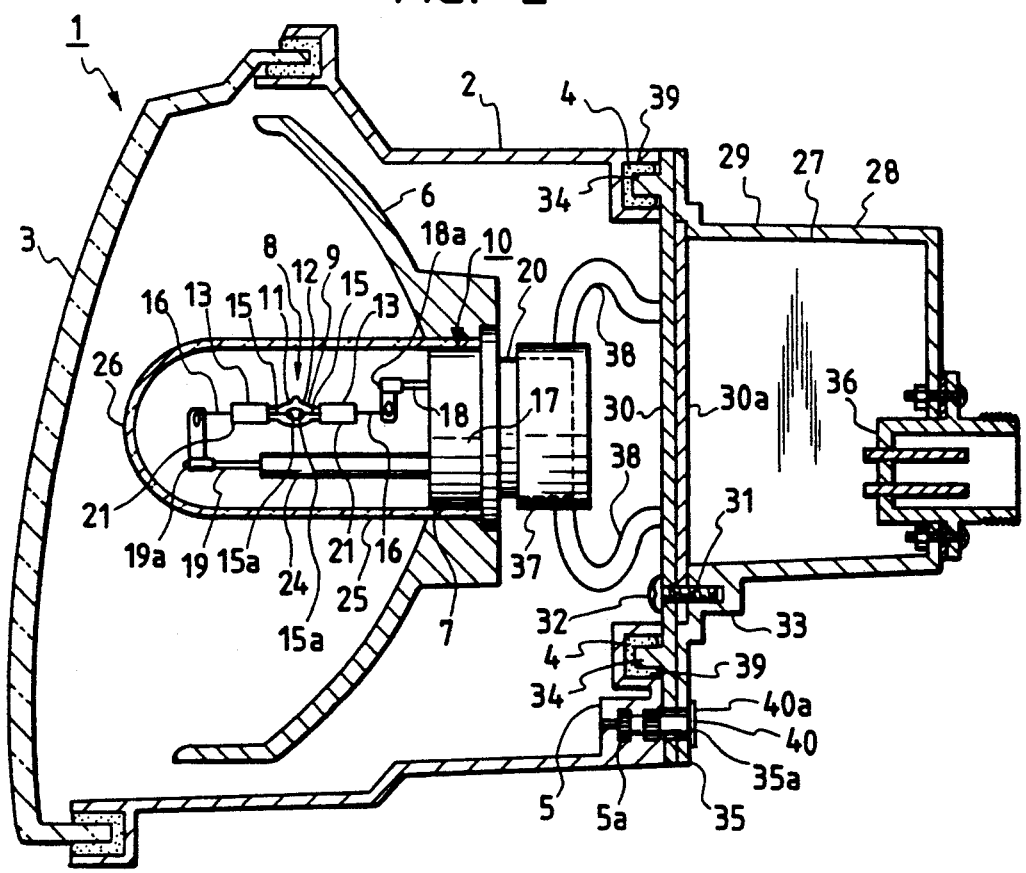
FIG. 2 is a longitudinal sectional view of a vehicular headlamp constructed in accordance with a first embodiment of the invention.
Figure 3:
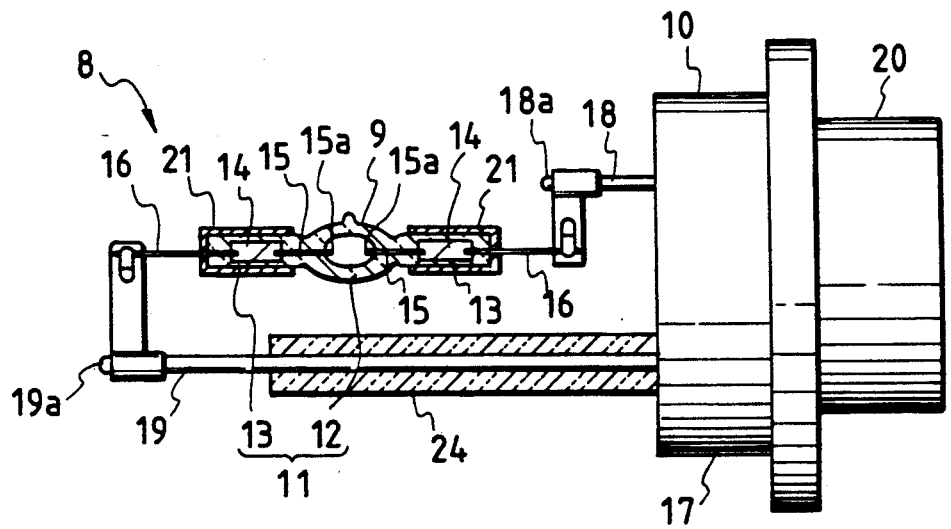
FIG. 3 is an enlarged side view, partly as a sectional view, showing a discharge lamp.

Vehicular headlamps constructed according to preferred embodiments of the invention will now be described with reference to the attached drawings.

FIGS. 2 through 5 shows an example of a vehicular headlamp which constitutes a first embodiment of the invention.

In these figures, reference numeral 1 designates a lamp housing secured to the vehicle body. The lamp housing, which is formed by molding thermoplastic resin, has a front opening and a rear opening. Reference numeral 3 designates a lens coupled to the lamp housing in such a manner as to cover the front opening.

A groove 4 is formed around the entire edge portion of the rear opening of the lamp housing 2 opening to the rear. The edge portion of the rear opening of the lamp housing includes a plurality of bosses 5 (only one boss being shown) formed outside the groove 4 at predetermined intervals. Each of the bosses 5 has a lower hole 5a which opens rearward.

Reference numeral 6 designates a reflector arranged inside the lamp housing 2. The reflector 6 is tiltably supported on the lamp housing with a conventional supporting structure. A lamp mounting hole 7 is formed in the rear end portion at the center of the reflector 6.

Reference numeral 8 designates a discharge lamp, such as a metal halide discharge lamp, composed of a light bulb 9 and a holder 10.

Reference numeral 11 designates the glass glove of the light bulb. The glass ball includes a discharge portion 12 elliptic in section, and pinch seal portions 13 extending in the opposite direction from the two ends of the discharge portion 12.

Reference numeral 14 designates two metal foils which are buried in respective ones of the pinch seal portions 13.

Reference numeral 15 designates two electrode rods. The electrode rods 15 have first end portions 15a which protrude into the chamber formed inside the discharge portion 12, while the remaining end portions of the electrode rods 15 are embedded in the pinch seal portions 13 and connected to respective ones of the metal foils 14. The first end portions of the electrode rods 15, which protrude into the chamber formed in the discharge portion 12, act as discharge electrodes.

Reference numeral 16 designates two lead wires. The lead wires 16 have first end portions embedded in the pinch seal portions 13 and 14 and connected to the metal foils 14, while the remaining end portions protrude from the outer end faces of respective ones of the pinch seal portions 13.

The holder 10 is composed of an insulating base 17 and two lead supports 18 and 19.

The base end portions of the lead supports 18 and 19 are embedded in the insulating base 17, and the front end portions 18a and 19a thereof are connected to the lead wires 16 of the light bulb 9. The rear end portion 20 of the insulating base 17 serves as a socket for the lamp.

Figure 5:
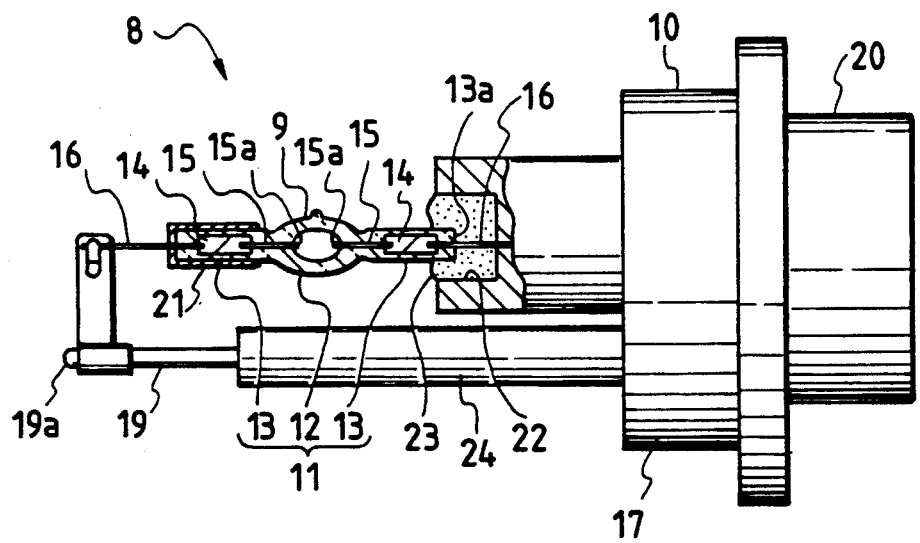
FIG. 5 is an enlarged side view, with parts cut away, showing a modification of the discharge lamp of FIG. 3.

In the discharge lamp 8 thus constructed, a non-reflecting film 21 is coated on the outside of each of the pinch seal portions 13 of the bulb 9 to prevent unwanted reflection of light. The unwanted reflection of light occurs at the end portion 13a of the pinch seal portion 13 closer to the insulating base 17. This difficulty may be eliminated by, as shown in FIG. 5, inserting the end portion 13a into a recess 22 formed in the insulating base 17, and then fixing it with adhesive 13.

A protective cylinder 24 of glass or ceramic is fitted around the longer of the two lead supports 19. The outer end of the protective cylinder 14 should be at least 5 mm ahead of a point equidistance from the discharge electrodes 15a. The protective cylinder 24 eliminates the difficulty of ultraviolet rays produced by the discharge being applied to the lead support 19, causing the latter to emit electrons due to a photoelectric effect.

Reference numeral 25 designates a transparent globe. The globe 25 is fixed to the insulating base 17 in such a manner that it covers the portions of the lead supports 18 and 19 which protrude from the insulating base 17, as well as the bulb 9.

A light shielding film 26 is formed on the front end portion of the globe 25 to prevent the projection of direct light.

The discharge lamp 8 thus constructed, except for the insulating base 17, is inserted into the reflector 6 through the lamp mounting hole 7. Under this condition, the discharge lamp 8 is connected to the reflector 6.

Reference numeral 27 designates a lighting circuit including a ballast. The lighting circuit 27 is accommodated in a casing 28.

The casing 28 includes a casing body 29 in the form of a box with a front opening, and a cover 30 closing the front opening of the Casing body 19. The casing body 29 is made of synthetic resin containing electrically conductive filaments or coated with electrically conductive paint, so that it provides an electromagnetic shielding effect. An electrically conductive shield plate 30a is provided on the inner surface of the cover 30. Under this condition, mounting screws 32 are inserted into through-holes 31 (only one through-hole being shown) formed in the cover 30, and then engaged with bosses 33 formed on the front end of the casing body 29, as a result of which the cover 30 is secured to the casing body 29.

An annular protrusion 34 is formed along the periphery of the front surface of the cover 30. A plurality of mounting pieces 35 (only one mounting piece being shown) extend outwardly from the periphery of the casing body 29. The mounting pieces 35 have respective through-holes 35a formed therein.

Reference numeral 36 designates a connector secured to the casing body 29. The aforementioned lighting circuit 27 is connected through the connector 36 to a wiring harness in the vehicle body; that is, the lighting circuit 27 is connected through the connector to the vehicle's battery.

Reference numeral 37 designates a connector which is connected to the socket 20 of the discharge lamp 7. The connector 37 is connected through lead wires 38 to the output terminals of the lighting circuit 27.

The connector 37 is connected to the socket 20 of the discharge lamp 8 supported by the reflector 6, and the groove 4 formed in the rear edge portion of the lamp housing 2 is filled with a hot-melt type adhesive 39. Under this condition, the protrusion 34 of the casing 28 which has accommodated the lighting circuit is engaged with the groove 9 through the hot-melt type adhesive 39. Thereafter, heated stud pins 40 are press-fitted into the lower holes 5a of the bosses 5 of the lamp housing 2 through the through-holes 35a of the mounting pieces 35 of the casing 28. That is, the stud pins 40 are secured to the lamp housing by thermal fusion. As a result, the mounting pieces 35 of the casing 28 are secured to the lamp housing 2 by the heads 40a of the stud pins 40.

Figure 4:
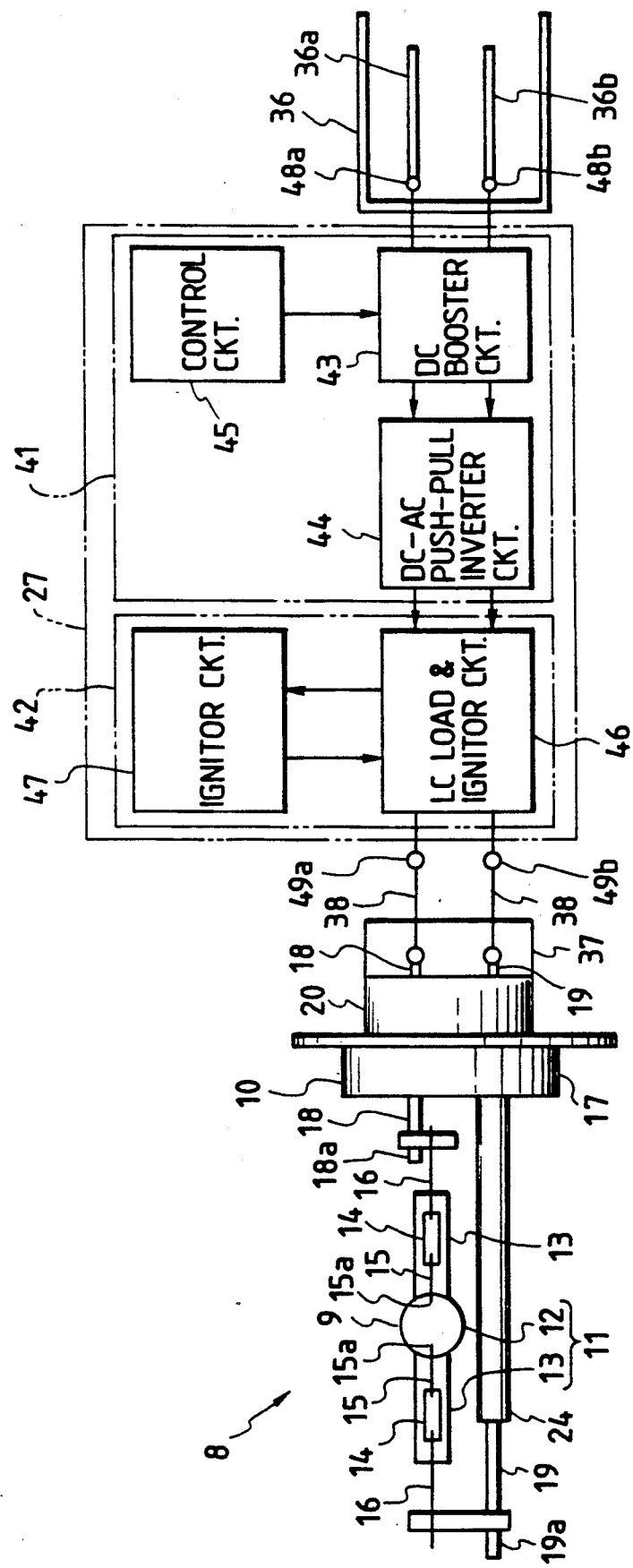
FIG. 4 is a block diagram showing an example of a lighting circuit.

An example of the lighting circuit 27 will be described with reference to the block diagram of FIG. 4.

The lighting circuit 27 includes a ballast 41 and an ignitor 42. The ballast 41 is composed of a DC booster circuit 43, a DC-AC push-pull inverter circuit 44, and a control circuit 45. The ignitor 42 includes an LC load and ignitor circuit 46, and an ignitor start circuit 47.

The DC booster circuit 43 has input terminals 48a and 48b connected to terminal pins 36a and 36b, respectively, of the above-described connector 36. The DC-AC push-pull inverter circuit 44 has input terminals connected to the output terminals of the DC booster circuit 43. The inverter circuit 44 converts a DC voltage provided by the DC booster circuit 43 into a sinusoidal AC voltage. The control circuit 45 operates to detect, for instance, the extinction of the discharge lamp 8, and controls the boosting operation of the DC booster circuit 43 according to this detection.

The LC load and ignitor circuit 46 has input terminals connected to the output terminals of the DC-AC push-pull inverter circuit 44. The output terminals 49a and 49a of the LC load and ignitor circuit 46 are connected through the lead wires 38 and the connector 37 to the lead supports 18 and 19 of the discharge lamp 8. The ignitor starting circuit 47 has a circuit for applying a start signal to the LC load and ignitor circuit 47 and for detecting the lamp current.

In the above-described vehicular headlamp 1, the casing 28 accommodating the lighting circuit 27 is secured to the lamp housing 2 in such a manner as to cover the rear opening of the lamp housing. Hence, the vehicular headlamp is free from the danger of the user touching the high voltage section, for instance, the connector 37 connected to the output terminals 49a and 49a of the lighting circuit 27. That is, the inventive headlamp is improved in safety. Furthermore, because the ignitor 42 is mounted close to the discharge lamp, the distance through which the high voltage current flows is short. Thus, the amount of electromagnetic noise generated due to the high voltage current can be decreased.

Figure 6:
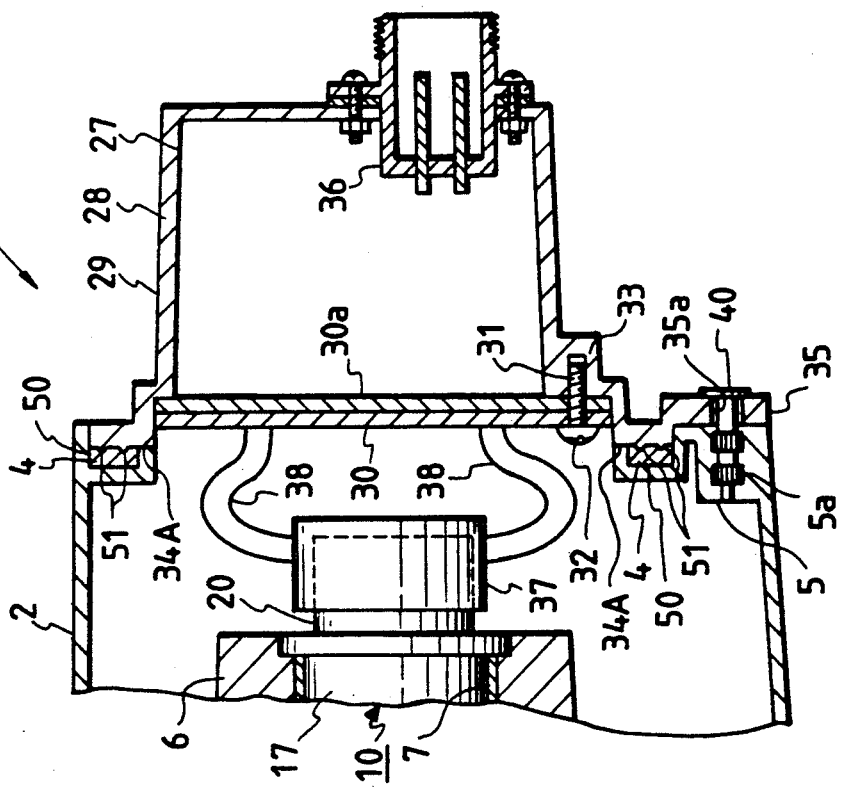
FIG. 6 is a longitudinal sectional view showing essential components of a second embodiment of a vehicular headlamp of the invention.

FIG. 6 shows another example of a vehicular headlamp 1A, which constitutes a second embodiment of the invention.

In the vehicular headlamp 1A, a sponge rubber member 50 is fitted in the groove 4 formed in the edge portion of the rear opening of the lamp housing 2. The casing 28 has a protrusion plate 34A relatively large in width at the front end opening, and protruding stripes 51 are formed on the front surface of the protrusion 34A. With the front surface of the protruding plate 34A pushed against the sponge rubber member 50, the protruding stripes 51 are engaged with the sponge rubber member 50. Under this condition, the casing 28 is secured to the lamp housing 2 with the stud pins 40. In the above-described first embodiment 1, hermetical engagement is accomplished with the protrusion 34 embedded in the hot melt type adhesive 39. On the other hand, in the second embodiment the protrusion 34A is abutted against the sponge rubber member 50 for the same purpose.

In the second embodiment, the remaining arrangement is the same as in the first embodiment, and elements corresponding functionally to those in the first embodiment are therefore designated by the same reference numerals or characters. Accordingly, a further detailed description of such elements is omitted. Also in the third embodiment described subsequently, parts corresponding functionally to those which have been described are designated by the same reference numerals or characters, and a further detailed description thereof is omitted.

Figure 7:
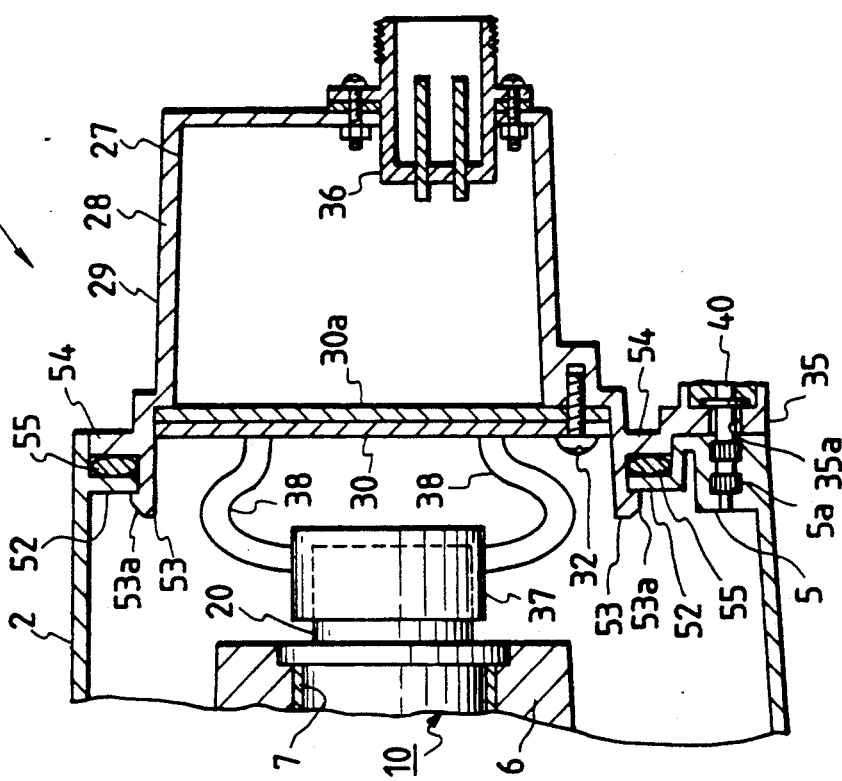
FIG. 7 is a longitudinal sectional view showing essential components of a third embodiment of a vehicular headlamp of the invention.

FIG. 7 shows another example of the inventive vehicular headlamp 1B, which constitutes a third embodiment of the invention.

The lamp housing 2 has an engaging edge member 52 which extends inwardly from the inner surface of the lamp housing 2 in such a manner that the engaging edge member 52 is slightly set back from the rear end of the lamp housing 2.

The casing body 29 of the casing 28 has a plurality of engaging pieces 53 (only upper and lower engaging pieces being shown) arranged along its front edge at suitable intervals and extending forwardly therefrom. The engaging pieces 53 have engaging pawls 53a at the ends which extend outward.

The casing body 29 has a retaining edge 54 which extends outward from its entire annular front end opening.

The engaging pieces 53 of the casing 28 are inserted into the rear opening of the lamp housing 2 with a rubber packing 55 interposed between the engaging edge 51 of the lamp housing 2 and the retaining edge 54 of the casing 28. In this operation, as the front end portions of the engaging pieces 53 are moved along the inner side wall of the engaging edge 52, the engaging pawls 53a are engaged with the front surface of the engaging edge 51. Hence, the rubber packing 55 is compressed by the engaging edge 52 and the retaining edge 54. Accordingly, the engaging pawls 53a are positively engaged with the engaging edge 51 by the force of repulsion stored in the compressed rubber packing 55, while the rear opening of the lamp housing is hermetically engaged with the casing 28.

As is apparent from the above description, the vehicular headlamp of the invention is characterized in that the reflector with the discharge lamp is arranged inside a lamp housing, whose front opening is covered with the lens, and at least the ignitor which forms the lighting circuit for the discharge lamp is secured to the lamp housing in such a manner as to cover the rear opening.

Hence, in the vehicular headlamp of the invention, the high voltage section is substantially closed; that is, it is not exposed. Thus, the vehicular headlamp is free from the danger of the user touching the high voltage section and receiving an electric shock. In other words, the vehicular headlamp of the invention is significantly improved in safety. Furthermore, since the ignitor is mounted close to the discharge lamp, the distance through which the high voltage current flows is short. Thus, the amount of electromagnetic noise produced due to the generation of the high voltage is decreased.

In each of the above-described embodiments, the lighting circuit 27, which incorporates the ignitor and the ballast as one unit, is accommodated in the casing 28. However, the ignitor and the ballast can be provided separately if desired. Only the ignitor is supported on the vehicle body near the vehicular headlamp, and it is connected to the ballast with lead wires.

While several embodiments of the invention have been illustrated and described in detail, it is particularly understood that the invention is not limited thereto or thereby.

Figure 8:
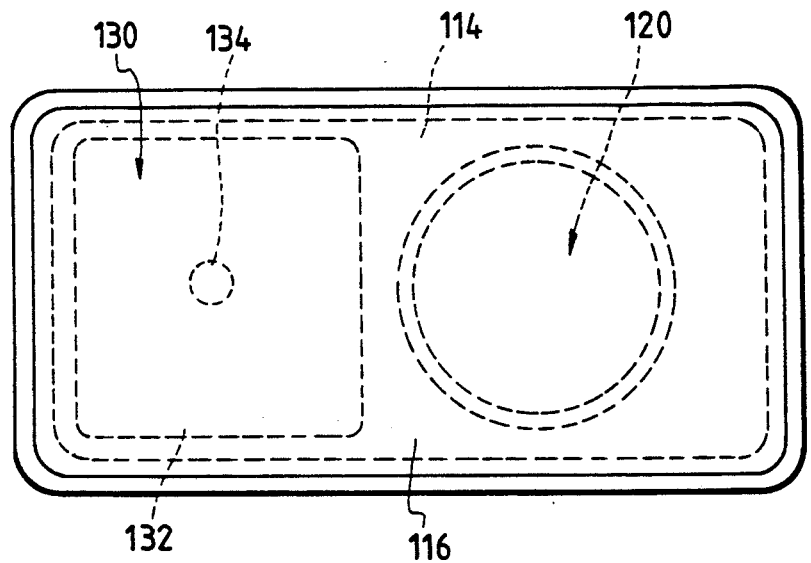
FIG. 8 is front view of a motor vehicular headlamp constructed in accordance with a further embodiment of the invention.
Figure 9:
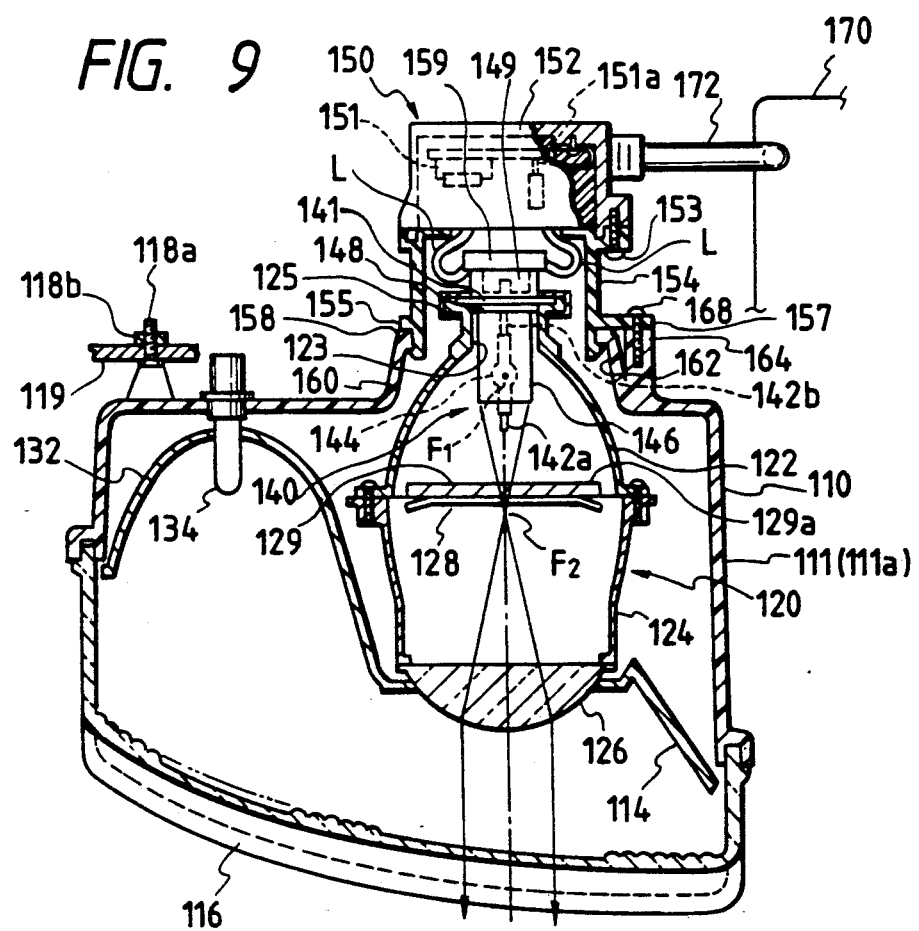
FIG. 9 is a horizontal sectional view of the headlamp of FIG. 8.
Figure 10:
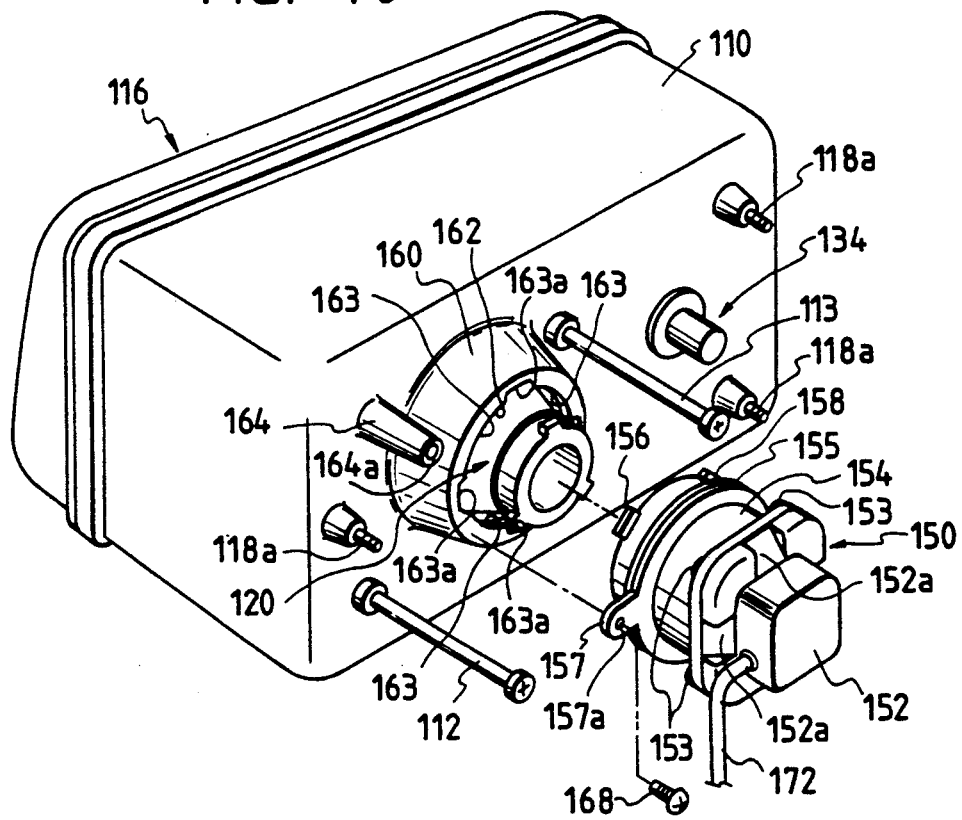
FIG. 10 is a perspective view of the motor vehicular headlamp of FIG. 8 as viewed from the rear.
Figure 11:
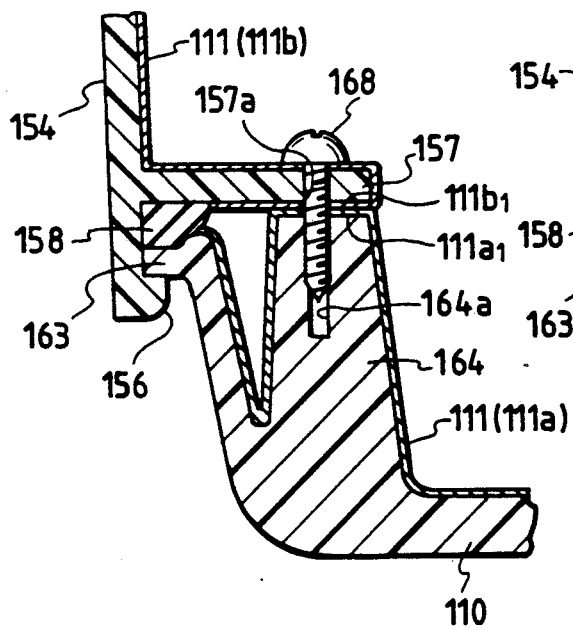
FIG. 11 is an enlarged sectional view showing a part of the bayonet engaging structure including a lightingcircuit-accommodating unit and the opening of the lamp body.

FIGS. 8 through 11 shows another embodiment of the invention. More specifically, FIG. 8 is a front view of a vehicular headlamp which includes a clearance lamp, FIG. 9 is a horizontal sectional view of the headlamp of FIG. 8, FIG. 10 is a rear view of the motor vehicular headlamp, and FIG. 11 is a perspective view showing a lighting-circuit-accommodating unit and components in the vicinity thereof.

In these figures, reference numeral 110 designates a container-shaped lamp body made of synthetic resin. The outer surface of the lamp body 110 is covered with an electrically conductive layer 111 (111a) of Cu, Ni or Zn by electrochemical plating or the like. The headlamp is secured to the vehicle body 119 with stud bolts 118a protruding from the rear surface of the lamp body 110 and nuts 118b (see FIG. 9). The electrically conductive layer 111a is electrically connected to the vehicle body 119 through the stud bolts 118a, which are made of electrically conductive material.

The lamp body 110 and a front lens 116 engaged with the front opening of the lamp body 110 define a lamp chamber in which a light projection unit 120 for forming the low beam of the headlamp and a light bulb 134 for the clearance lamp are juxtaposed. The light projection unit 120 is tiltably supported with an aiming mechanism, which includes two aiming screws 112 and 113 supported on the rear side of the lamp body 110 in such a manner that they extend forward (see FIG. 10), and a ball joint (not shown) supported on the lamp body. Reference numeral 114 designates a cover of synthetic resin engaged with the lamp body in such a manner that it surrounds the light projection unit 120. The surface of the cover 114 is formed as a mirrored surface by vacuum deposition thereon of a layer of aluminum. A reflector 132 for the clearance lamp 130 is provided beside the cover 114 in such a manner that the reflector and the cover form a single unit. The bulb 134 for the clearance lamp, which is inserted into the rear wall of the lamp body 110, extends forwardly through the reflector 132.

The light projection unit 120 includes a substantially ellipsoidal metal reflector 122, a discharge bulb 140 fitted in a bulb insertion hole 123 formed in the rear end portion of the reflector, and a metal lens holder 124 the front opening of which a projection lens 126 is engaged with and connected to the front opening of the reflector 122. The reflector, the discharge bulb, and the metal lens holder are provided as one unit. Reference numeral 125 designates a locking cap for fixedly holding the discharge bulb 140 in the bulb inserting hole 123.

In the discharge bulb 140, a discharge lamp 144 is supported by a pair of lead supports 142a and 142b which are embedded in an insulating base in such a manner that they protrude forwardly. The discharge section of the discharge lamp 144 is disposed at the first focal point $F_1$ of the reflector 122. A cylindrical ultraviolet-ray shielding globe 146 is fixedly secured to the front surface of the insulating base 141 through a ceramic disk 148 in such a manner that the globe 146 surrounds the discharge lamp 144. Hence, when light from the discharge section passes through the ultraviolet-ray shielding globe 146, ultraviolet rays in a range of hazardous wavelengths are cut off.

A clear-cut shade 128 integral with the lens holder 124, and an ultraviolet ray shielding filter 129 fixedly secured to the lens holder 124 with a metal leaf spring member 129a are provided near the second focal point $F_2$ of the reflector 122. The light from the discharge section of the discharge lamp 144 is reflected by the reflector 122, converged at the second focal point $F_2$ of the reflector 122, and then projected as a parallel beam by the projection lens 126.

Reference numeral 150 designates a lighting-circuit-accommodating unit which incorporates a lighting circuit for the discharge bulb in its casing. The unit 150 is mounted on the rear wall of the lamp body 110. The lighting circuit 151, which applies a high voltage across the electrodes of the discharge lamp 144 to allow the latter to perform a continuous and stable discharge operation, is accommodated in the aluminum casing. More specifically, the lighting circuit 151 is made integral with the casing through resin molding. The lighting circuit 151, which is essential for application of high voltage, is formed on a printed circuit board. The lighting circuit is electrically connected to the vehicle body through a ground circuit. In addition, the lighting circuit 151 is connected to a ballast circuit in a casing 170 provided below the headlamp through a lead wire 171 extending from the lighting-circuit-accommodating unit 150, and it is connected to the discharge bulb 140 through lead wires L extending forwardly of the casing. Reference numeral 159 designates a female connector connected to the lead wires L. The female connector 159 is connected to a male connector 149 provided for the discharge bulb.

A cylindrical extension 154 made of synthetic resin is connected to the aluminum casing 152 of the lighting-circuit-accommodating unit 150 with screws 153. The cylindrical extension 154 is bayonet-engaged with a circular opening 161 formed in the rear wall of the lamp body 110, and further it is threadably connected to the lamp body with a self-tapping screw 168. More specifically, the rear wall of the lamp body 110 located behind the discharge bulb 140 is formed into a cylindrical rear protrusion 160 in which the unit inserting circular opening 162 is formed. Three inward protrusions 163 and cuts 163a are alternatingly formed in the peripheral portion of the opening 162 at equal angular intervals. On the other hand, a flange 155, which is to be abutted against the periphery of the opening, and three outward protrusions 156, which are to be bayonet-engaged with the inward protrusions 163 of the opening, are formed on the outer wall of the front end portion of the cylindrical extension 154. With the outward protrusions 156 engaged with the cuts 163a, the lighting-circuit-accommodating unit 150 is turned clockwise. As a result, the outward protrusions 156 are engaged with the inward protrusions 163 in the axial direction of the headlamp so that the cylindrical extension 154 is temporarily secured to the opening 162. An annular seal packing 158 is interposed between the outward protrusions 156 of the cylindrical extension 156 and the inward protrusions 163 of the opening so as to sufficiently hermetically seal the components thus bayonet-engaged. The unit casing 152, which is rectangular in overall configuration, has recesses 152a formed in its outer wall so that it can be readily gripped in the operator's hand. A boss 164 with a threaded hole 164a protrudes from the rear wall of the lamp body near the cylindrical rear protrusion 160, while a plate-shaped protrusion 157 having a threaded hole 157a extends from the flange 155 of the cylindrical extension 154. When the unit 150 is bayonet-engaged with the opening 161, the plate-shaped protrusion 157 is abutted against the end face of the boss 164 with the threaded holes 164a and 157a in alignment with each other. The self-tapping screw 168 is threadably engaged with the threaded hole 157a, whereby the lighting-circuit-accommodating unit 150 is fixed so that it cannot turn in the circumferential direction of the circular opening 162. Thus, the lighting-circuit-accommodating unit 150 is fixedly engaged with the opening 162 with a first fixing arrangement inclusive of the protrusions 156 and 163 which are bayonet-engaged with each other, and with a second fixing arrangement, namely, the single self-tapping screw. Therefore, the unit 150 is prevented from coming off the lamp body even if vibrated; that is, it is positively engaged with the lamp body.

Similarly as in the lamp body, an electrically conductive layer 111 (111b) is formed on the outer surface of the cylindrical extension 154. The electrically conductive layer 111b of the cylindrical extension 154 is electrically connected to the electrically conductive layer 111a of the lamp body through the self-tapping screw 168. More specifically, as shown in FIG. 11, the electrically conductive layer 111b formed on the surface of the outward protrusion 157 is pushed against the electrically conductive layer 111a₁ formed on the end face of the boss 164 with the self-tapping screw 167; that is, the electrically conductive layers 111a and 111b are electrically connected to each other. The unit casing 152 made of electrically conductive aluminum is electrically connected to the electrically conductive layer 111b of the cylindrical extension 154 through screws 153 which connect the casing 152 to the cylindrical extension 154. The unit casing 152 is connected to the ground terminal 151a of the ground circuit in the lighting circuit 151. Hence, the electrically conductive layers 111a and 111b and the unit casing 152 made of electrically conductive aluminum which surround the discharge bulb 140 and the lighting circuit 151 are electrically connected to the vehicle body through the ground terminal 151a of the lighting circuit. Accordingly, electromagnetic noise generated by the discharge bulb 140, the lighting circuit 151 and the lead wires L is shunted to the vehicle body through the unit casing 151 and the ground circuit, and thus is prevented from reaching electrical circuits outside the headlamp. Furthermore, since the electrically conductive layers 111a and 111b and the unit casing 152 are electrically connected to the vehicle body through the stud bolts 118a, even if the conductive path through the ground terminal 151a of the lighting circuit is interrupted, the noise shielding effect is maintained by the conductive path through the stud bolts 118a.

Even if electrical devices around the head lamp produce electromagnetic noise, such electromagnetic noise is blocked by the electrically conductive layers 111 (111a and 111b) and the aluminum unit casing 152 serving as a electrically conductive layer; that is, the lighting circuit 132 in the lamp body 111 is not affected by such electromagnetic noise.

The lighting-circuit-accommodating unit 150 is fixedly engaged with the opening 162 by first connecting the female connector 159 of the lighting circuit to the male connector of the bulb. Thereafter, the lighting-circuit-accommodating unit 150 is bayonet-engaged with the opening 162 so as to be temporarily fixed. Under this condition, the one self-tapping screw 168 is engaged with the threaded hole 157a to connect the protrusion 157 to the boss 164 thereby to prevent the unit 150 from being turned circumferentially. This operation of temporarily fixing the unit 150 can be readily achieved with only one hand. When the unit 150 has been temporarily fixed in the above-described manner, the threaded hole is set in place, and therefore the self-tapping screw 168 can be engaged with the boss with ease.

In the above-described embodiment, the lighting-circuit-accommodating unit 150 is formed by combining the casing 152 and the cylindrical extension 154, which are provided as separate components. However, the casing 152 and the cylindrical extension 154 can be provided as one unit. The provision of the casing 152 and the cylindrical extension 154 as separate components as in the above-described embodiment is advantageous in that a single design of the casing 152 holding the lighting circuit can be applied to a variety of headlamps with cylindrical extensions 154 formed separately according to the openings of the lamp bodies.

In the above-described embodiment, the self-tapping screw 168 is employed for preventing the rotation of the lighting-circuit-accommodating unit 150 bayonet-engaged with the opening 162 of the lamp body. However, the self-tapping screw 168 can be replaced with other mechanical tightening devices such as a clip or a stud bolt. Alternatively, the lighting-circuit-accommodating unit may be fixed with an adhesive.

Figure 12:
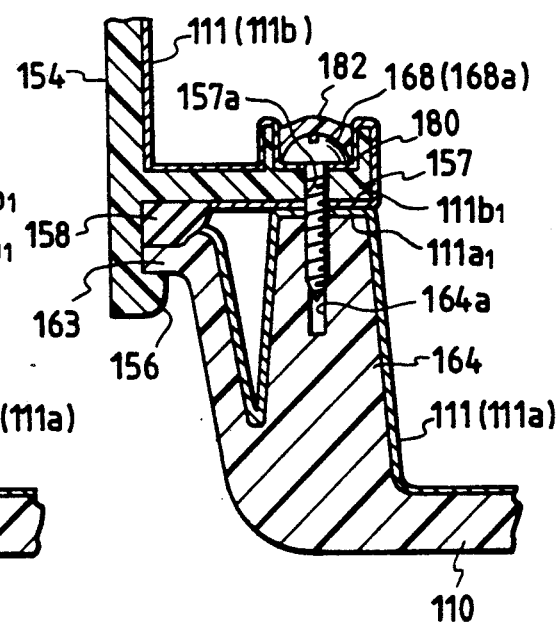
FIG. 12 is a view similar to FIG. 11 showing an alternate structure of a bayonet engaging structure.

FIG. 12 shows an alternative arrangement of the bayonet engaging structure. As shown in FIG. 12, in which like reference numerals designate like elements in FIG. 11, a cylindrical wall 180 extends from the plate-shaped protrusion 157 to surround the threaded hole 157a. A hot-melt material 182 is filled in the cylindrical wall 180 to cover the head 168a of the self-tapping screw 168. It is advantageous to cover the head 168a of the self-tapping screw 168 since a high voltage is applied to the portions from the lead wires L extending from the lighting-circuit-accommodating unit 150 to the female connector 159 when the discharge bulb is turned on. It would be dangerous for the user to touch such portions. The structure of the cylindrical wall 180 and the hot-melt material 182 avoids the possibility of touching the dangerous portions because the operator cannot remove the lighting-circuit-accommodating unit 150 easily.

The invention has been described with reference to a projection type headlamp which performs light distribution with the light projection unit. However, it should be noted that the technical concept of the invention can be equally applied to a reflection type headlamp which performs light distribution with a parabolic reflector and light distribution control steps formed in the front lens.

As is apparent from the above description, with the motor vehicular headlamp according to the invention, the lighting-circuit-accommodating unit can be bayonet-engaged with the circular opening of the lamp body in a single action; that is, it can be temporarily engaged with the opening so that it cannot come off the lamp body, and thereafter the lighting-circuit-accommodating unit is fixedly secured with an additional fixing device so that it cannot turn in the circumferential direction of the circular opening. Hence, the installation of the lighting-circuit-accommodating unit can be achieved with ease. Furthermore, being fixed with two fixing structures, i.e., the bayonet engagement structure and the additional fixing device, the lighting-circuit-accommodating unit can be positively connected to the lamp body.

What is claimed is:

1. A vehicular headlamp, comprising:
a lamp housing having a front opening and a rear opening;
a lens covering said front opening of said lamp housing;
a reflector mounted in said lamp housing;
a discharge lamp mounted on said reflector;
a lighting circuit comprising an ignitor for said discharge lamp, said lighting circuit being secured to said lamp housing in such a manner as to cover said rear opening;
a casing accommodating said lighting circuit, said casing being made of a material having an electromagnetic shielding effect selected from the group consisting of a material comprising a synthetic resin containing conductive particles, and a material comprising a synthetic resin coated with an electrically conductive paint; and
lead wires connecting said discharge lamp to said lighting circuit.

2. The vehicular headlamp of claim 1, wherein said casing comprises a box-shaped body portion having a front opening and a cover closing said front opening.

3. The vehicular headlamp of claim 2, wherein a plurality of through-holes are formed in said cover and corresponding bosses are formed on a front end of said body portion of said casing, said cover being joined to said body portion by screws inserted through said through-holes and engaged with said bosses.

4. The vehicular headlamp of claim 2, wherein said cover has an annular protrusion along the periphery of a front surface of said cover, and said housing has a groove therein formed around said rear opening, said annular protrusion being received in said groove, and further comprising a hot-melt adhesive filled in said groove and sealing said annular protrusion to said groove.

5. The vehicular headlamp of claim 2, wherein said cover has a protrusion plate formed along the periphery of a front surface of said cover, and said housing has a groove therein formed around said rear opening, said protrusion plate having a plurality of protruding stripes formed on a front surface thereof, said protrusion plate being received in said groove, and further comprising a sponge rubber member filled in said groove and sealing said protrusion plate in said groove.

6. The vehicular headlamp of claim 3, wherein said housing has an engaging edge member extending inward from an inner surface of said lamp housing slightly set back from said rear opening, and said casing body has a plurality of engaging pieces arranged along a front edge thereof at predetermined intervals and extending forward therefrom, said engaging pieces having engaging pawls at end portions thereof, and a retaining edge extending outwardly from said front opening, and a rubber packing disposed between and compressed by said engaging edge and said retaining edge.

7. The vehicular headlamp of claim 2, wherein said body portion comprises a plurality of mounting pieces extending outward from a periphery thereof, said mounting pieces having through-holes formed therein for receiving stud pins for securing said casing to said housing, said stud pins being secured to said lamp housing by thermal fusion.

8. The vehicular headlamp of claim 7, further comprising connector means mounted on a rear end of said casing.

9. A vehicular headlamp, comprising:
a lamp body having a circular opening formed in a rear wall thereof;
an electrically conductive coating on an outer surface of said lamp body;
a discharge bulb mounted in said lamp body;
a lighting-circuit-accommodating unit comprising a casing and a lighting circuit mounted in said casing;
lead wires for connecting said discharge bulb to said lighting circuit;
means for bayonet-engaging said lighting-circuit-accommodating unit with said circular opening from a rear side of said circular opening; and
means for fixing said lighting-circuit-accommodating unit to said lamp body for preventing said lighting-circuit-accommodating unit from rotating relative to said circular opening.

10. The vehicular headlamp of claim 9, wherein said electrically conductive coating is made from a material selected from the group consisting of Cu, Ni and Zn.

11. The vehicular headlamp of claim 9, further comprising a plurality of stud bolts for securing said lamp body to a body of a vehicle, said conductive coating being grounded to said body of said vehicle through said stud bolts.

12. The vehicle headlamp of claim 9, further comprising a light projection unit comprising a reflector, a projection lens, and a lens holder mounting said projection lens on said reflector, said discharge lamp being mounted on said reflector.

13. The vehicular headlamp of claim 9, further comprising a ballast circuit provided below said lamp body, and lead wires connecting said ballast circuit to said lighting circuit.

14. The vehicular headlamp of claim 9, wherein said casing is made of aluminum.

15. The vehicular headlamp of claim 9, wherein said bayonet-engaging means comprises a cylindrical extension fixed to said casing, and a cylindrical protrusion extending rearward from said rear wall of said lamp body, said circular opening being formed in said circular protrusion, said cylindrical extension being received in said circular opening.

16. A vehicular headlamp, comprising:
a lamp body having a circular opening formed in a rear wall thereof;
a discharge bulb mounted in said lamp body;
a lighting-circuit-accommodating unit comprising a casing and a lighting circuit mounted in said casing;
lead wires for connecting said discharge bulb to said lighting circuit;
means for bayonet-engaging said lighting-circuit-accommodating unit with said circular opening from a rear side of said circular opening,s aid bayonet-engaging means comprising a cylindrical extension fixed to said casing, and a cylindrical protrusion extending rearward from said rear wall of said lamp body, said circular opening being formed in said circular protrusion, said cylindrical extension being received in said circular opening, a flange and a plurality of outward protrusions formed on an outer wall of a front end portion of said cylindrical extension, and a plurality of inward protrusions formed alternately with cuts on a peripheral portion of said rear opening, said outward protrusions of said cylindrical extension being engaged with said inward protrusions on said peripheral portion of said rear opening; and means for fixing said lighting-circuit-accommodating unit to said lamp body for preventing said lighting-circuit-accommodating unit from rotating relative to said circular opening.

17. The vehicular headlamp of claim 16, further comprising an annular seal packing interposed between said outward protrusions and said inward protrusions.

18. The vehicular headlamp of claim 16, wherein said fixing means comprises a boss formed on said rear wall, said boss having a threaded screw hole therein, a plate-like protrusion formed on said cylindrical extension having a through-hole formed therein, and a screw passing through said through-hole and threadedly engaged with said screw hole.

19. The vehicular headlamp of claim 18, further comprising a first electrically conductive coating formed on an outer surface of said lamp body, and a second conductive coating formed on an outer surface of said cylindrical extension, said first conductive coating being electrically connected to said second conductive coating through said screw.

20. The vehicular headlamp of claim 18, wherein said plate-like protrusion comprises a cylindrical wall surrounding a head of said screw, and further comprising a hot-melt material filling an interior of said cylindrical wall and covering said head of said screw.

21. A vehicular headlamp, comprising:
a lamp housing having a front opening and a rear opening;
a lens covering said front opening of said lamp housing;
a reflector mounted in said lamp housing;
a discharge lamp mounted on said reflector;
a lighting circuit comprising an ignitor for said discharge lamp, said lighting circuit being secured to said lamp housing in such a manner as to cover said rear opening;
a casing accommodating said lighting circuit, said casing comprising a box-shaped body portion having a front opening and a cover closing said front opening;
an electrically conductive shield plate provided on an inner surface of said cover; and
lead wires connecting said discharge lamp to said lighting circuit.

22. A vehicular headlamp, comprising:
a lamp housing having a front opening and a rear opening, said housing having an engaging edge member extending inward from an inner surface of said lamp housing slightly set back from said rear opening;
a lens covering said front opening of said lamp housing; a reflector mounted in said lamp housing;
a discharge lamp mounted on said reflector;
a lighting circuit comprising an ignitor for said discharge lamp, said lighting circuit being secured to said lamp housing in such a manner as to cover said rear opening;
a casing accommodating said lighting circuit, said casing comprising a box-shaped body portion having a front opening and a cover closing said front opening, said casing body having a plurality of engaging pieces arranged along a front edge thereof at predetermined intervals and extending forward therefrom, said engaging pieces having engaging pawls at end portions thereof, and a retaining edge extending outwardly from said front opening, and a rubber packing disposed between and compressed by said engaging edge and said retaining edge; and
lead wires connecting said discharge lamp to said lighting circuit.

* * * * *